United States Patent [19]

Lottes et al.

[11] 3,887,528

[45] June 3, 1975

[54] PRECIPITATION POLYMERIZATION OF 1:1 COPOLYMERIZATES OF MALEIC ACID ANHYDRIDE AND ALLYL ACETATE

[75] Inventors: Karlheinz Lottes, Munich; Hans Katzer, Freising, both of Germany

[73] Assignee: Consortium fur Elektrochemische Industrie GmbH, Munich, Germany

[22] Filed: June 11, 1973

[21] Appl. No.: 369,075

[30] Foreign Application Priority Data
June 9, 1972  Germany............................ 2228107

[52] U.S. Cl............................................. 260/78.5 R
[51] Int. Cl......................... C08f 1/11; C08f 15/36
[58] Field of Search................ 260/78.5 R, 78.5 BB

[56] References Cited
UNITED STATES PATENTS

| | | | |
|---|---|---|---|
| 2,464,062 | 3/1949 | Strain.................................... | 260/80 |
| 2,522,775 | 9/1950 | Bryant................................ | 260/78.5 |
| 2,562,852 | 7/1951 | Baer.................................... | 260/78.5 |
| 3,218,302 | 11/1965 | Melamed............................. | 260/80 |
| 3,553,183 | 1/1971 | Field et al........................... | 260/78.5 |

*Primary Examiner*—Joseph L. Schofer
*Assistant Examiner*—John Kight, III
*Attorney, Agent, or Firm*—Hammond & Littell

[57] ABSTRACT

This invention relates to a method of precipitation polymerization of 1:1 copolymerizates of maleic acid anhydride and allyl acetate consisting of polymerizing a solution of a monomer mixture of maleic acid anhydride and allyl acetate in an organic diluent in which said monomer mixture is soluble but the copolymer produced is substantially insoluble in the presence of at least one suspension aid and a free-radical-former selected from the group consisting of dialkyl peroxydicarbonates, dicycloalkyl peroxydicarbonates and lower alkyl esters of peracids at a temperature and time sufficient to effect polymerization, and recovering a 1:1 copolymerizate of maleic acid anhydride and allyl acetate.

14 Claims, No Drawings

PRECIPITATION POLYMERIZATION OF 1:1 COPOLYMERIZATES OF MALEIC ACID ANHYDRIDE AND ALLYL ACETATE

THE PRIOR ART

It is known from the literature, Bartlett et al, J. Am. Chem. Soc 68, 1495 (1946) that maleic acid anhydride can be block-copolymerized with allyl acetate by means of free-radicals to 1:1 copolymers. But considerable difficulties are encountered in this block polymerization. A viscous to rubber-like material is thus obtained after a monomer conversion of about 50%, which makes stirring and evacuation of the reactor impossible. This rubber-like material contains the unreacted monomers, in addition to the copolymer. Separation of the polymer from the residual monomers, for example, by filtration, is not possible. The separation must therefore be effected by laborius dissolution and precipitation operations. Furthermore, there is a possibility that the reaction will run away when higher initiator concentrations are used, because of the poor heat dissipation.

It is also known that the copolymerization of allyl acetate and maleic acid anhydride can be carried out in solvents, like dioxane, acetone or methylethyl ketone. But here the monomer conversion rates are low. In addition, the separation of the monomers must again be effected by dissolution and precipitation operations. The resulting mixture of solvents and precipitants, allyl acetate and maleic acid anhydride requires, in addition, laborious working up processes.

OBJECTS OF THE INVENTION

An object of the invention was therefore to provide a method for the copolymerization of allyl acetate and maleic acid anhydride where the polymerization can be brought to very high monomer conversion rates and the separation of the copolymers formed from the residual monomers can be effected in a simple manner. The product formed should have a high purity.

A further object of the invention is the development of a method of precipitation polymerization of 1:1 copolymerizates of maleic acid anhydride and allyl acetate consisting of polymerizing a solution of a monomer mixture of maleic acid anhydride and allyl acetate in an organic diluent in which said monomer mixture is soluble but the copolymer produced is substantially insoluble in the presence of at least one suspension aid and a free-radical-former selected from the group consisting of dialkyl peroxydicarbonates, dicycloalkyl peroxydicarbonates and lower alkyl esters of peracids at a temperature and time sufficient to effect polymerization, and recovering a 1:1 copolymerizate of maleic acid anhydride and allyl acetate.

These and other objects of the invention will become more apparent as the description therof proceeds.

DESCRIPTION OF THE INVENTION

The invention concerns a method for the production of a powdered 1:1 copolymer from allyl acetate and maleic acid anhydride, where this copolymer flows freely after drying and the polymerization is carried out in the presence of a suspension aid. The method of the invention involves the production of copolymers from maleic acid anhydride and allyl acetate by polymerization of the monomers by means of free-radical-formers. The method is characterized in that maleic acid anhydride and allyl acetate are copolymerized in an organic diluent, which is both a solvent for the monomers and a precipitant for the copolymer, in the presence of a suspension aid and by using dialkyl peroxydicarbonates or per esters as the catalyst or free-radical formers.

More particularly, the invention provides for a method of precipitation polymerization of 1:1 copolymerizates of maleic acid anhydride and allyl acetate consisting of polymerizing a solution of a monomer mixture of maleic acid anhydride and allyl acetate in an organic diluent in which said monomer mixture is soluble but the copolymer produced is substantially insoluble in the presence of at least one suspension aid and a free-radical-former selected from the group consisting of dialkyl peroxydicarbonates, dicycloalkyl peroxydicarbonates and lower alkyl esters of peracids at a temperature and time sufficient to effect polymerization, and recovering a 1:1 copolymerizate of maleic acid anhydride and allyl acetate.

With the measures according to the invention we obtain colorless copolymers which are powdered and free-flowing after separation from the diluent and after drying. The products are obtained in high purity and need therefore not be re-precipitated. Another advantage of the method is that the copolymerization can be carried out up to high monomer conversion rates.

The monomers, allyl acetate and maleic acid anhydride, are generally used in a molar ratio of 1:1, but minor deviations have no effect on the composition of the resulting copolymers and on the conversion. With greater deviations, for example, 25% by weight of allyl acetate, 75% by weight of maleic acid anhydride, the composition of the copolymer does not change markedly from a 1:1 ratio, but the percent of monomer conversion naturally decreases since more unreacted monomer is present.

Suitable organic diluents which can be used in the method according to the invention are those which dissolve the monomers but not the copolymer. The suspension aid should likewise be easily soluble in the diluent. As examples, the following can be used: liquid benzines of various boiling ranges, particularly, those at or above the temperature employed in the polymerization, aromatic hydrocarbons, such as benzene and alkyl benzenes with 1 to 3 alkyl radicals of a chain length of up to 3 carbon atoms, for example, toluene, xylene, ethylbenzene. The weight ratio of the diluent to the monomer is generally between 0.5:1 and 10:1. Preferably, benzene or toluene are used as a diluent and a weight ratio of diluent to monomer is maintained between 0.5:1 to 4:1, preferably 2:1.

The suspension aids are added mostly in amounts of 0.01% to 2% by weight, based on the monomers. Frequently it is advisable to dissolve the suspension aids in a small portion of the diluent before they are used, and to use them in dissolved form. The addition of suspension aids is absolutely necessary since without them a finely-divided polymer dispersion would be obtained which, however, soon agglomerates on the bottom of the reaction vessel into a cake which contains considerable amounts of monomers.

From the great number of known suspension aids which can be used with advantage in the method according to the invention, the use of polyvinyl alkyl ethers, such as polyvinyl lower alkyl ethers and particularly polyvinyl ethyl ether, in amounts of 0.01 to 1% by weight, preferably 0.025 to 0.25% by weight, based on the monomers has proved to be preferable. An advantage of this suspension aid is that an easily filtrable product is obtained even with small amounts of this aid.

For the production of copolymers with higher bulk densities, it was found of advantage to use polystyrene as a suspension aid in amounts of 0.1% to 0.5% by weight, preferably 0.15 to 0.25% by weight, based on the monomers.

Only per esters or dialkyl peroxydicarbonates can be used as free-radical-formers. They are used preferably in amounts of 0.01 to 5% by weight, particularly 0.5 to 2% by weight, based on the monomers. Other free-radical-formers lead only to low reaction rates in precipitation polymerization of allyl acetate and maleic acid anhydride. Examples for dialkyl peroxydicarbonates are particularly di-lower alkyl peroxydicarbonates such as diisopropyl peroxydicarbonate, dihexyl peroxydicarbonate, diethylhexyl and dicycloalkyl having from 5 to 8 carbon atoms in the cycloalkyl peroxydicarbonates such as dicyclohexyl peroxydicarbonate. Examples of per esters are particularly per esters of alpha-branched alcohols, and especially tertiary lower alkyl peralkanoates such as tert.-butyl peroctoate, tert.-butyl perisononanate and particularly tert.-butyl perpivalate.

The copolymerization is carried out in customary polymerization vessels which are frequently equipped with stirrers. The polymerization temperature depends on the solvent (diluent) used and on the free-radical-former. Preferably, the polymerization is effected between 5° and 140°C, using benzene and dicyclohexyl peroxydicarbonate, and especially between 40° and 70°C.

The end product is separated from the organic diluents, for example by filtration or by centrifuging and the powder obtained is dried.

Frequently, it is of advantage to carry out a continuous copolymerization by continuously separating the copolymer formed and continuously dosing in the monomers to maintain a constant amount of monomers, suspension aids, free-radical-formers and, if necessary, the diluent. The additions and separations can be effected either continuously or intermittently in certain time intervals. A peeler centrifuge is frequently used for the separation.

The copolymers produced by the process of the invention generally have bulk densities of between 300 and 400 gm/l (determined according to DIN 53468). The residual content of diluents is mostly between 0.5 and 1% by weight and the content of maleic acid anhydride is generally from 1 to 2% by weight. The intrinsic viscosity determined at 20°C has usually a value of between 1 and 25 [100 cm$^3$/g ]

The copolymers produced according to the method of the invention can be used in many fields. For example, they are suitable as anionic polyelectrolytes, either in the acid form after hydrolysis or after neutralization with bases, in the form of their salts. Furthermore, the reaction of allyl acetate-maleic anhydride copolymers with alcohols yields copolymers containing half esters of the maleic acid moiety. The acetate groups can be split off at the same time either completely or partly. These reaction products as well as the unreacted copolymers can be used as a crosslinking component in plastics used in varnishes.

The following examples are illustrative of the invention without being limitative in any respect.

EXAMPLE 1

147 gm of maleic acid anhydride, 150 gm of allyl acetate, 0.3 gm of polyvinyl-ethyl-ether, and 594 gm of benzene were introduced into a dry polymerization apparatus filled with nitrogen, and the mixture was heated under stirring. As soon as the polymerization temperature of 55°C has been attained, 5.94 gm of dicyclohexyl peroxydicarbonate, corresponding to 2.0% by weight, based on the total monomer content, were added. After 8 hours of polymerization, the polymer sludge was filtered off warm (about 50°C) and washed with benzene. After drying, a completely colorless free-flowing powder was obtained. The monomer conversion was about 8%, the copolymer contained 2% by weight of maleic acid anhydride and had a intrinsic viscosity of 11 [100 cm$^3$/g.] in acetone at 20°C.

EXAMPLE 2

With a recipe as in Example 1, but with 1.5% by weight of t-butyl perpivalate as the free-radical-former catalyst, a conversion of 69% was obtained at a polymerization temperature of 72°C after 8 hours. The copolymer contained 1.2% of maleic acid anhydride and had a intrinsic viscosity in acetone at 20°C of 10 [100 cm$^3$/g.]

EXAMPLE 3

With a recipe as in Example 1, but with 2% by weight of t-butyl peroctoate as the free-radical-former catalyst, and the same amount of toluene as a diluent, a conversion of 72% was achieved after 20 hours of polymerization at a polymerization temperature of 85°C. The copolymer contained about 1.4% of maleic acid anhydride and had a intrinsic viscosity in acetone at 20°C of 1 [100 cm$^3$/g ]

EXAMPLE 4

In a polymerization apparatus as in Example 1, 882 gm of maleic acid anhydride, 900 gm of allyl acetate and 3654 gm of benzene were charged, and the mixture was heated to 55°C. Then 0.2% by weight (bases on the monomers) or polystyrene as a suspension aid and 1.5% by weight (based on the monomers) of dicyclohexyl peroxydicarbonate as a free-radical-former was added. After 8 hours of polymerization, a conversion of 65% was obtained. The copolymer contained about 1.3% of maleic acid anhydride and had a intrinsic viscosity in acetone a 20°C of 11 [100 cm$^3$/g ]

EXAMPLE 5

(Comparison Block Copolymerization) 294 gm of maleic acid anhydride and 300 gm of allyl acetate were charged into a dry polymerization apparatus filled with nitrogen and the mixture was heated under stirring. As soon as the polymerization temperature of 65°C had been attained, 2.88 gm of powdered benzoylperoxide, corresponding to 0.5% by weight, based on the total monomer content, were added. In the course of 19 hours, the reaction solution becomes increasingly viscous. The separation of the copolymer formed from the monomer mixture could only be achieved by repeated reprecipitations. The conversion was about 50%.

EXAMPLE 6

(Comparison, Solution Polymerization)

147 gm of maleic acid anhydride, 150 gm of allyl acetate and 300 gm of acetone were charged into a dry polymerization apparatus filled with nitrogen, and the mixture was heated under stirring. As soon as the polymerization temperature of 55°C had been attained, 1.78 gm of dicyclohexyl peroxydicarbonate, corresponding to 0.6% by weight, based on the total monomer content, were added. After 6 hours, the copolymer was precipitated by pouring the reaction solution into a large excess of benzene. The conversion was about 30%. After repeated washing with benzene, the polymer still contained about 5.5% by weight of maleic acid anhydride.

EXAMPLE 7

(Comparison, Precipitation Polymerization without Suspension Aids)

294 gm of maleic acid anhydride, 300 gm of allyl acetate and 594 gm of benzene were charged into a dry polymerization apparatus filled with nitrogen, and the mixture was heated under stirring. As soon as the polymerization temperature of 65°C had been attained, 2.88 gm of benzoyl peroxide, corresponding to 0.5% by weight, based on the total monomer content, were added. The originally formed polymer globules agglomerated rapidly and formed a cake of the consistency of hard rubber on the bottom of the vessel and on the stirrer. After 23 hours the benzene phase was poured off. The copolymer was obtained as a hard, brittle mass. The conversion was about 22%.

EXAMPLE 8

(Comparison Precipitation Polymerization with Suspension Aid and Benzoylperoxide as a Free-Radical-Former)

147 gm of maleic acid anhydride, 150 gm of allyl acetate, 0.3 gm of polyvinyl-ethyl-ether and 594 gm of benzene were charged into a dry polymerization apparatus filled with nitrogen, and the mixture was heated under stirring. As soon as the polymerization temperature of 65°C had been attained, 4.46 gm of benzoyl peroxide, corresponding to 1.5% by weight based on the total monomer content, were added. After 22.5 hours, the solution was milky. Practically no polymer had been formed.

With the same recipes, but with the following free-radical-former catalysts, nonanoyl peroxide, lauroyl peroxide, or $\alpha, \alpha'$-azo-isobutyronitrile, no reactions were achieved either.

The preceding specific embodiments are illustrative of the practice of the invention. It is to be understood, however, the other expedients known to those skilled in the art, or disclosed herein, may be employed without departing from the spirit of the invention or the scope of the appended claims.

We claim:

1. A method of precipitation polymerization of 1:1 copolymerizates of maleic acid anhydride and allyl acetate consisting of polymerizing a solution of a monomer mixture of maleic acid anhydride and allyl acetate in an organic diluent in which said monomer mixture is soluble but the copolymer produced is substantially insoluble in the presence of at least one suspension aid and a free-radical-former selected from the group consisting of dialkyl peroxydicarbonates, dicycloalkyl peroxydicarbonates and lower alkyl esters of peracids at a temperature and time sufficient to effect polymerization, and recovering a 1:1 copolymerizate of maleic acid anhydride and allyl acetate.

2. The method of claim 1 wherein said monomer mixture is employed in a substantially equimolar ratio.

3. The method of claim 1 wherein said organic diluent is employed in a weight ratio of diluent to monomer mixture of from 0.5:1 to 4:1.

4. The method of claim 3, wherein said weight ratio of diluent to monomer mixture is 2:1.

5. The method of claim 1 wherein said at least one suspension aid is soluble in said organic diluent and is employed in amounts of from 0.01 to 1% by weight, based on the weight of the monomers.

6. The method of claim 5 wherein said suspension aid is a member selected from the group consisting of polyvinyl lower alkyl ethers and polystyrene.

7. The method of claim 5 wherein said suspension aid is a polyvinyl lower alkyl ether employed in an amount of from 0.25 to 0.25% by weight, based on the weight of the monomers.

8. The method of claim 7 wherein said polyvinyl lower alkyl ether is polyvinyl ethyl ether.

9. The method of claim 5 wherein said suspension aid is polystyrene employed in an amount of from 0.1 to 0.5% by weight, based on the weight of the monomers.

10. The method of claim 9 wherein said polystyrene is employed in an amount of from 0.15 to 0.25% by weight, based on the weight of the monomers.

11. The method of claim 1 wherein said free-radical-formers are employed in an amount of from 0.01 to 5% by weight, based on the weight of the monomers.

12. The method of claim 11 wherein said free-radical-formers are employed in an amount of from 0.5 to 2% by weight, based on the weight of the monomers.

13. The method of claim 1 wherein said temperature is maintained between 5° and 140°C.

14. The method of claim 1 wherein said method is conducted continuously.

* * * * *